US009166356B2

(12) United States Patent
Cates et al.

(10) Patent No.: US 9,166,356 B2
(45) Date of Patent: Oct. 20, 2015

(54) UNSTABLE IMAGING RESONATOR (71) Applicant: The Boeing Company, Chicago, IL (US)

(72) Inventors: Michael C. Cates, Albuquerque, NM (US); Matthew H. Beckmann, Albuquerque, NM (US); Matthew D. Nixon, Albuquerque, NM (US)

(73) Assignee: THE BOEING COMPANY, Chicago, IL (US)

( * ) Notice: Subject to any disclaimer, the term of this patent is extended or adjusted under 35 U.S.C. 154(b) by 30 days.

(21) Appl. No.: 14/056,581

(22) Filed: Oct. 17, 2013

(65) Prior Publication Data

US 2015/0109662 A1  Apr. 23, 2015

(51) Int. Cl.
*H01S 3/07* (2006.01)
*H01S 3/081* (2006.01)
*H01S 3/082* (2006.01)
*H01S 3/16* (2006.01)
*H01S 3/08* (2006.01)
*H01S 3/06* (2006.01)

(52) U.S. Cl.
CPC ............ *H01S 3/0818* (2013.01); *H01S 3/0604* (2013.01); *H01S 3/076* (2013.01); *H01S 3/082* (2013.01); *H01S 3/08045* (2013.01); *H01S 3/1618* (2013.01); *H01S 3/1643* (2013.01)

(58) Field of Classification Search
CPC ....... H01S 3/076; H01S 3/0818; H01S 3/082; H01S 3/08045; H01S 3/0604; H01S 3/1618; H01S 3/1643

USPC ............................................ 359/346; 372/95
See application file for complete search history.

(56) References Cited

U.S. PATENT DOCUMENTS

| 6,888,872 | B2 | 5/2005 | Vetrovec |
| 7,724,800 | B2 | 5/2010 | Sumida et al. |
| 7,826,513 | B2 | 11/2010 | Bossert et al. |
| 7,885,301 | B2 | 2/2011 | Curtin et al. |
| 7,978,746 | B2 | 7/2011 | Holmes |
| 8,035,892 | B2 | 10/2011 | Curtin et al. |
| 2002/0172253 | A1* | 11/2002 | Vetrovec ........................ 372/95 |
| 2008/0205475 | A1* | 8/2008 | Chenausky et al. ............. 372/95 |
| 2009/0268775 | A1* | 10/2009 | Holmes ........................... 372/95 |
| 2010/0027572 | A1* | 2/2010 | Widen et al. .................... 372/33 |
| 2012/0155503 | A1* | 6/2012 | Vetrovec ........................ 372/95 |

* cited by examiner

*Primary Examiner* — Eric Bolda
(74) *Attorney, Agent, or Firm* — Toler Law Group, PC (57) ABSTRACT

In one aspect a power amplifier comprises a first plurality of laser disks disposed in a first vertical plane and a second plurality of laser disks disposed in a second vertical plane, opposite the first vertical plane, wherein the plurality of laser disks are disposed in a central horizontal plane, and a first plurality of reflecting mirrors disposed in the first vertical plane and a second plurality of reflecting mirrors disposed in the second vertical plane, wherein a first set of reflecting are disposed in a lower horizontal plane and a second set of reflecting mirrors are disposed in an upper horizontal plane, wherein respective laser disks and reflecting mirrors adjacent along an optical axis are positioned to provide a 1:1 imaging system therebetween. Other aspects may be described.

20 Claims, 6 Drawing Sheets

UNSTABLE IMAGING RESONATOR

RELATED APPLICATIONS

None

FIELD OF THE DISCLOSURE

The subject matter described herein relates to laser resonators systems, and more particularly an unstable imaging resonator.

BACKGROUND

Solid state laser disks have an active thin disk gain medium that is mounted along its back surface to a heat sink. The back surface is highly reflective at the laser and pump wavelengths and the front surface is highly transmissive at the laser and pump wavelengths. An external laser beam enters the disk at its front surface, or "face", propagates to the back surface, is reflected by the back surface back to the front surface, where it leaves the disk. While propagating in the disk, the laser beam extracts energy from the disk.

The energy lost is restored by the pumped laser beam which also enters the disk at its front surface, propagates to the back surface, is reflected and propagates to the front surface where it leaves the disk. While propagating through the disk the pump beam deposits energy into the disk and stimulates the medium. An example active medium is Yb:YAG (ytterbium-doped yttrium aluminum garnet) which is provided in a circular disk format that may be 10 to 2000 millimeter (mm) in diameter and 200 micron (0.20 mm) thick. A pumping light source is typically provided by a diode laser array which provides a greater than unity gain at the laser wavelength, so as to have the laser disk function as an active mirror. The pumping beam is presented to the face at an angle of incidence that avoids interference with the laser beam.

Laser disk output beam power may be increased by increasing the power delivered by the pumping light source, and/or by combining multiple laser disks in a laser disk resonator. A stable laser disk resonator is used to combine the individual output laser power of multiple disks into a multi kilowatt laser output beam used, for example, in metal working applications. The high power output beams produced by stable laser disk resonators are multimode, and are typically fifty times diffraction limit. While this is suitable for industrial applications, such as laser welding, it is not suitable for applications which require a more precise and tightly focused output laser beam. It is, therefore, desirable to provide a multiple laser disk resonator that produces a high energy, near diffraction limited laser beam that may be used for more precise laser beam applications.

SUMMARY

In one aspect, an unstable imaging resonator comprises a feedback mirror and a primary mirror which provide unstable resonator oscillation of a laser signal which propagates along an optical axis between the feedback mirror and the primary mirror, a first plurality of laser disks disposed in a first vertical plane and a second plurality of laser disks disposed in a second vertical plane, opposite the first vertical plane, wherein the plurality of laser disks are disposed in a central horizontal plane, and a first plurality of reflecting mirrors disposed in the first vertical plane and a second plurality of reflecting mirrors disposed in the second vertical plane, wherein a first set of reflecting are disposed in a lower horizontal plane and a second set of reflecting mirrors are disposed in an upper horizontal plane. wherein respective laser disks and reflecting mirrors adjacent in the optical axis are positioned to provide a 1:1 imaging system therebetween.

In another aspect, a power amplifier comprises a first plurality of laser disks disposed in a first vertical plane and a second plurality of laser disks disposed in a second vertical plane, opposite the first vertical plane, wherein the plurality of laser disks are disposed in a central horizontal plane, and a first plurality of reflecting mirrors disposed in the first vertical plane and a second plurality of reflecting mirrors disposed in the second vertical plane, wherein a first set of reflecting are disposed in a lower horizontal plane and a second set of reflecting mirrors are disposed in an upper horizontal plane, wherein respective laser disks and reflecting mirrors adjacent along an optical axis are positioned to provide a 1:1 imaging system therebetween.

The features, functions and advantages discussed herein can be achieved independently in various embodiments described herein or may be combined in yet other embodiments, further details of which can be seen with reference to the following description and drawings.

BRIEF DESCRIPTION OF THE DRAWINGS

The detailed description is described with reference to the accompanying figures.

DETAILED DESCRIPTION

In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

The present invention provides methods and apparatus for creating a single multi kilowatt, single transverse mode, near diffraction limited output laser beam from an array of N laser disks. To provide the multi kilowatt output power beam in a single transverse mode it is necessary to use an unstable resonator where the laser output is provided from the edge of the feedback mirror. Single mode stable resonators cannot be used with the larger diameter, e.g., 1 cm, high power disks because the fundamental mode diameter for practical stable resonators is only 1 or 2 mm in diameter.

Figure 1:
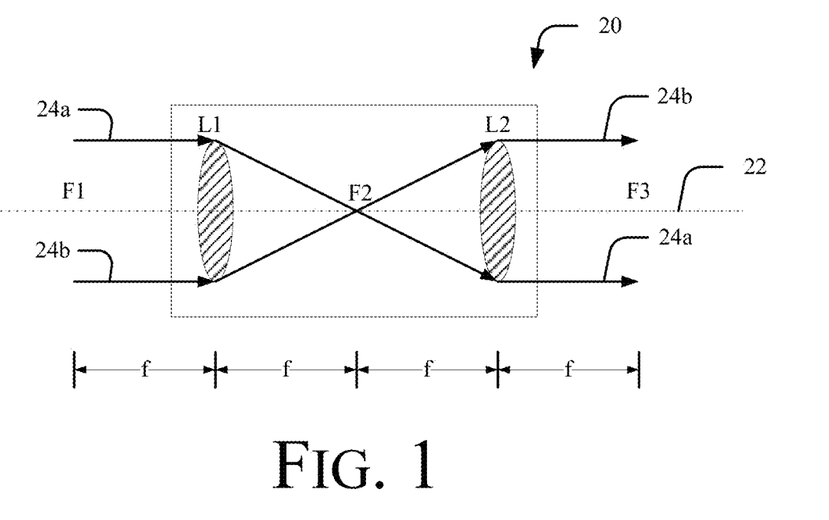
FIG. 1 is a schematic block illustration of a 1:1 imaging system in accordance with examples.

To provide a near diffraction limit, single transverse mode laser the laser disks are disposed with associated reflecting mirrors in the unstable resonator in a manner such that each laser disk and reflecting mirror combination functions as a 1:1 imaging system. This also provides full imaging of each laser disk output onto the adjoining laser disks. This provides a single transverse mode resonator, as well as provides for efficient disk power extraction. To achieve this the laser disks and reflecting mirrors are arranged so that the spherical mirror surfaces of each are positioned in respective laser disk and reflecting mirror image planes that are mutually spaced at a selected image distance over the extent of their placement along the optical axis. As described in further detail below, each laser disk-reflecting mirror combination provides a 1:1 imaging system To teach the principals involved in placing imaging systems within optical resonators, reference is first made to FIGS. 1 through 10. FIG. 1 illustrates a 1:1 imaging system 20 having identical positive lenses L1 and L2. The lenses each have focal length f and, as placed on the optical axis 22, they have a common focal point F2. The 1:1 imaging system 20 images all objects with unity magnification, so an electromagnetic field 24a, 24b with complex amplitude u(x, y) in the object plane F1 is simply relayed by the system 20 to the image plane F3 with complex amplitude u(−x,−y). The relay is essentially a zero optical distance propagation and a 180-degree rotation. The physical length of the 1:1 imaging system 20 is 4 f but its optical length is zero.

Figure 2:
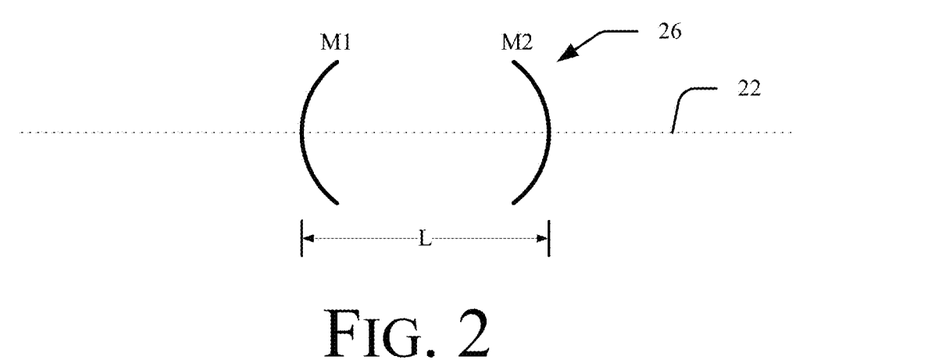
FIG. 2 is a schematic illustration of a general resonator in accordance with examples.
Figure 3:
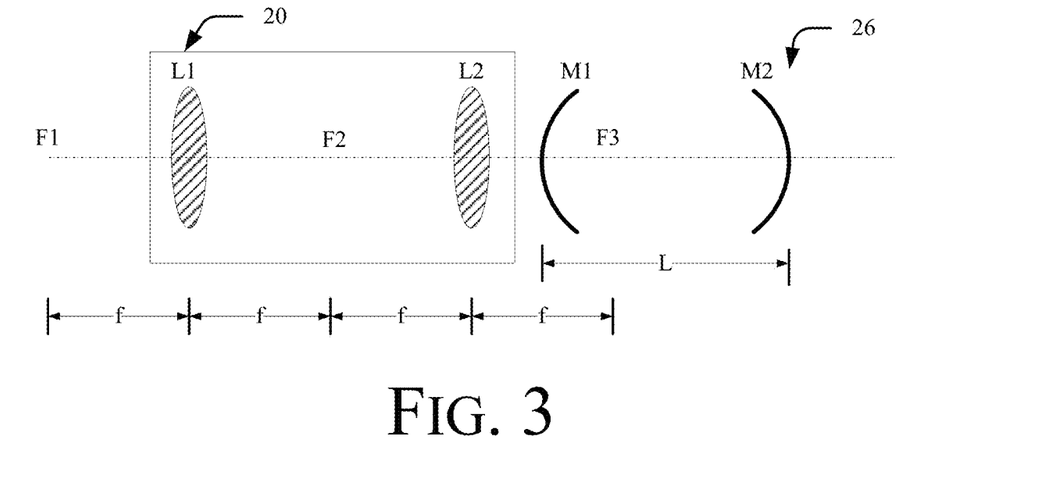
FIG. 3 is a schematic illustration is a simplified illustration of an imaging system and a resonator in accordance with examples.
Figure 4:
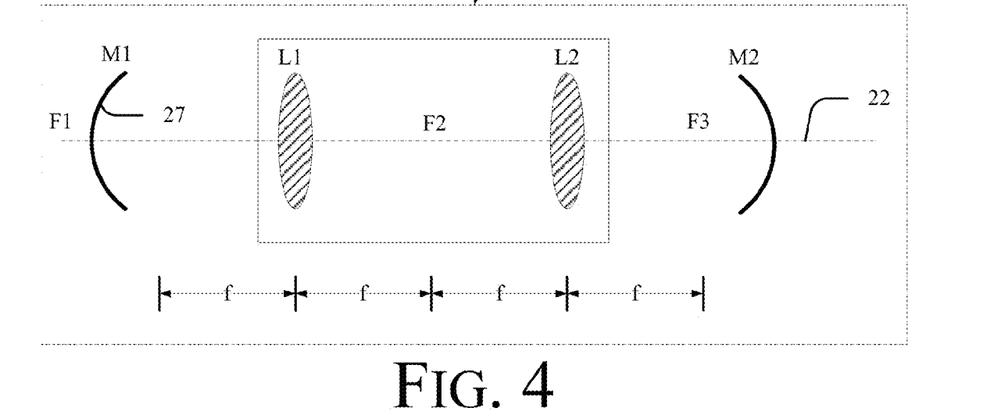
FIG. 4 is a schematic illustration of a rearrangement of the configuration illustrated in FIG. 3.

FIG. 2 illustrates an arbitrary two-mirror resonator 26 shown with concave end mirrors M1 and M2 with separation L. The resonator 26 may be placed on the optical axis 22 of the imaging system 20, as shown in FIG. 3. In FIG. 4, the mirror M1 is then moved leftward by a distance 4 f to a relocated image location 27, which provides the optical resonator 26 with the 1:1 imaging system 20 imbedded inside, to form an imaging optical resonator 28. This imaging optical resonator 28 is basically identical to the resonator 26 (FIG. 2) in bare cavity performance, while differing in hardware. That is, the bare cavity fields at mirrors M1 and M2 are virtually identical for the resonator 26 and the imaging resonator 28, as are the magnitudes of the bare cavity eigenvalues. The insertion of the 1:1 imaging system 20 does not alter the essential features of the resonator's output laser beam. If the resonator 26 (FIG. 2) is designed for a desired resonator performance, e.g., good transverse mode discrimination, the imaging resonator 28 will possess these same desired properties. To obtain this performance, one must be certain that lenses L1 and L2 do not significantly aperture the intracavity beam in propagation through the 1:1 imaging system.

Therefore, the process for inserting a 1:1 imaging system inside any resonator is to choose a point on the optical axis of the resonator. Take all resonator optical elements to the left of this point and move them leftward by a distance 4 f, then insert the 1:1 imaging system with physical length 4 f into the vacant space provided. The imaging resonator formed will possess all of the bare cavity performance attributes of the original resonator. This process can be extended to creating an imaging resonator system having N number of cascaded 1:1 imaging systems, by vacating a space equal to N4 f, and the new resonator formed will possess the bare cavity performance attributes of the original parent resonator.

Figure 5:
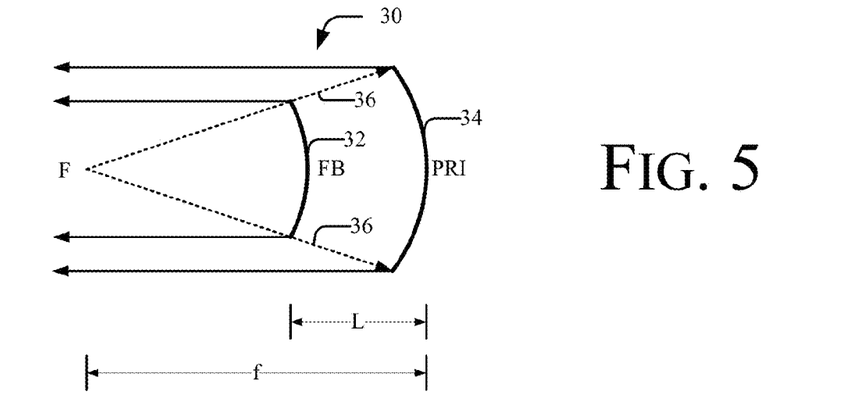
FIG. 5 is a schematic illustration of a first type of unstable resonator in accordance with examples.
Figure 6:
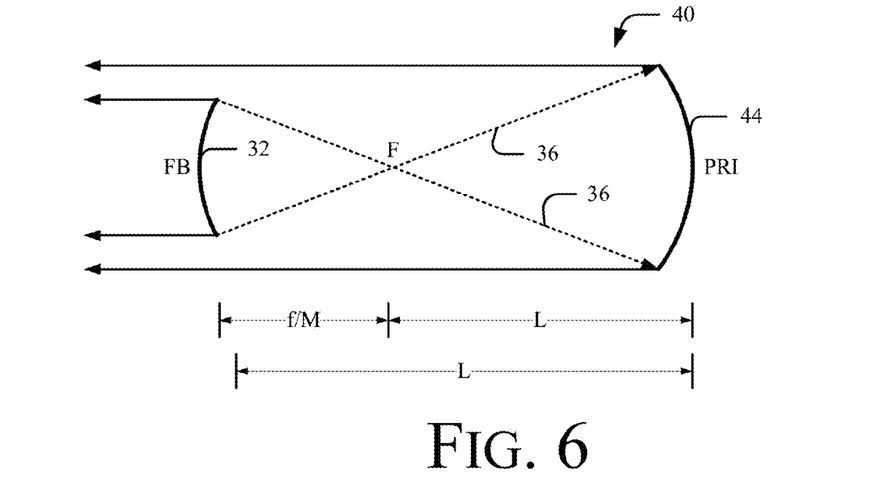
FIG. 6 is a schematic illustration of a second type of unstable resonator in accordance with examples.

Two types of unstable resonator which may be used with the present invention are shown schematically in FIGS. 5 and 6. FIG. 5 is a positive branch unstable resonator 30, having a spherical convex feedback mirror (FB) 32 and a spherical concave primary mirror (PRI) 34. The light 36 reflected by feedback mirror 32 appears to be coming from the focal point F. The light 36 is collimated upon reflection from the primary mirror 34 to produce a collimated annular output laser beam 38 around the feedback mirror 32. The feedback and primary mirrors 32, 34 share a common focus F so that the resonator 30 is a confocal unstable resonator.

The diameter of the feedback mirror 32 is 2 a and that of the primary mirror is 2 Ma, or greater, where M>1 and is the resonator magnification. The focal length of the primary mirror 34 is f. This is M times the focal length of the feedback mirror 32, which equals f/M. The distance between the mirrors 32, 34 is $L=f(M-1)/M$.

FIG. 6 is a negative branch unstable resonator 40 having spherical concave feedback mirror (FB) 42 and spherical concave primary mirror (PRI) 44. The light 46 reflected by feedback mirror 42 is focused at focal point F and collimated upon reflection from the primary mirror 44 to produce a collimated annular output laser beam 48 around the feedback mirror 32. The feedback and primary mirrors 32, 34 share a common focus F so that resonator 40 is a confocal unstable resonator. The primary mirror 44 has a focal length f and the feedback mirror 42 has a focal length f/M, where M>1 is the magnification of the unstable resonator. The mirrors are separated by a distance $L=f(M+1)/M$.

Figure 7:
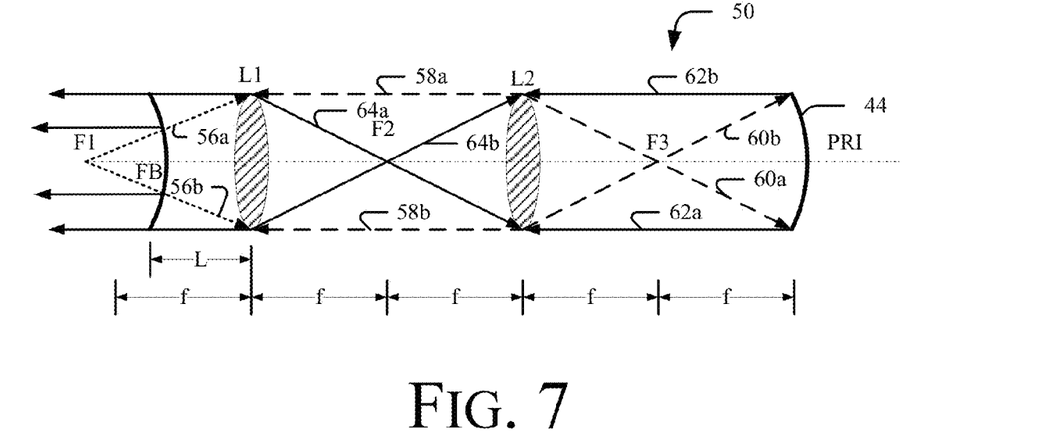
FIGS. 7-8 are schematic illustrations of principals of operation of a resonator in accordance with examples.
Figure 8:
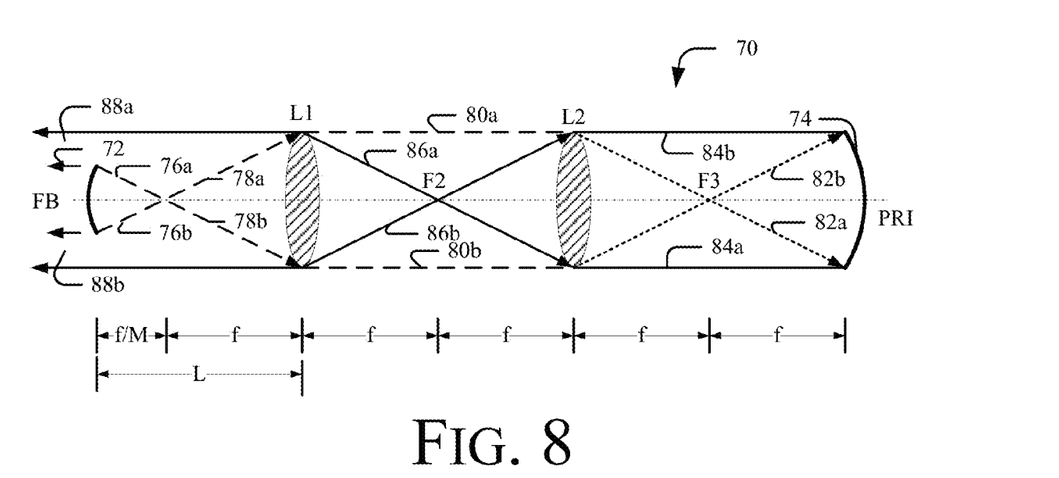

The resonators 30 and 40 are shown in FIGS. 7 and 8 with the 1:1 imaging system 20 of FIG. 5 imbedded within them. For illustrative purposes only, and with no limitations inferred, the imaging resonators of FIGS. 7 and 8 are shown with the feedback mirrors and lens L1 having a common focus F1 and the primary mirrors and lens L2 having a common focus F3. Also for convenience the focal length of the primary mirrors is f and that of the feedback mirrors is f/M. This makes the intracavity beam sizes on L1, L2 and the primary mirrors to all have a diameter 2 Ma (where M again is the magnification and a is the diameter of the feedback mirrors); this is true for both the feedback pass and the output pass. If the resonators of FIGS. 6 and 7 possess good transverse mode discrimination and produce near diffraction limited output beams, then the imaging resonators of FIGS. 7 and 8 will do likewise.

Referring to FIG. 7, which is an unstable, positive branch imaging resonator (PBIR) 50. The lenses L1, L2 and the spherical concave primary mirror 52 all have focal lengths f and are separated by 2 f. The spherical convex feedback mirror 54 has focal length f/M, and is located a distance L from L1. Once again, $L=f(M-1)/M$, where M>1 is the magnification of the resonator 50. When the collimated output beam is reflected by feedback mirror FB, the reflected light becomes a diverging beam 56a, 56b which appears to come from F1.

We will now follow this beam for one round trip with the reflected beam illustrated by dashed lines and the return, or forward beam, shown in solid. When the beam 56a, 56b reaches L1 it is then collimated 58a, 58b and lens L2 focuses the beam at F3 so that it is diverging 60a, 60b as it reaches the primary mirror 52. The primary mirror reflects it as a collimated beam 62a, 62b, which is then focused by lens L2 at F2 and it is diverging 64a, 64b when incident on lens L1, which then collimates it as output beam 66a, 66b. When the collimated beam reaches feedback mirror 54 it has completed an entire round trip. In making the round trip the beam has passed through focus twice (at F3 and F2), and the even number of intracavity foci characterizes the resonator 50 as being an unstable, positive branch imaging resonator (PBIR). A PBIR will always have an even number of intracavity foci.

FIG. 8 is a negative branch imaging resonator (NBIR) 70, with a spherical concave feedback mirror 72 and a spherical concave primary mirror 74. As described above, the lenses L1, L2 and the primary mirror 74 all have a focal length f and are separated by 2 f. The feedback mirror 72 has a focal length f/M and is located a distance L from L1. Once again L=f(M+1)/M, where M>1 and is the magnification of the unstable resonator. When the collimated beam impinges on feedback mirror 72 it is reflected. It becomes a converging beam 76a, 76b as it passes through focus at F1, and is diverging 78a, 78b when incident at lens L1.

We will now follow this beam for one round trip. When the beam 78a, 78b reaches L1 it is then collimated 80a, 80b and then focused by lens L2 at F3 so that it is diverging 82a, 82b when it reaches the primary mirror 74. This completes the feedback pass, and the primary mirror reflects the beam as a collimated beam 84a, 84b. Lens L2 focuses the beam at F2 so that it is diverging 86a, 86b when incident at lens L1, which then collimates it into output beam 88a, 88b. When the collimated beam reaches FB it has completed the output pass as well as the entire round trip. In making the round trip, the beam has passed through focus three times (at F1, F3, and F2), and the odd number of intracavity foci characterizes resonator 70 as an unstable, negative branch imaging resonator (NBIR). An NBIR will always have an odd number of intracavity foci.

The above descriptions in respect of FIGS. 1-10 illustrated the principals involved in embedding a 1:1 imaging system into an unstable resonator to provide both an NBIR and a PBIR type unstable resonator, either of which is applicable to the present invention. The following is a detailed description of a 1:1 imaging system that substitutes a laser disk for one or both of the imaging system lenses L1 and L2 of FIGS. 1-4 and 7-8. Although this teaching is provided in terms of an unstable NBIR it should be understood that an unstable PBIR is equally applicable, and that comparable embodiments can be made for the PBIR.

Figure 9:
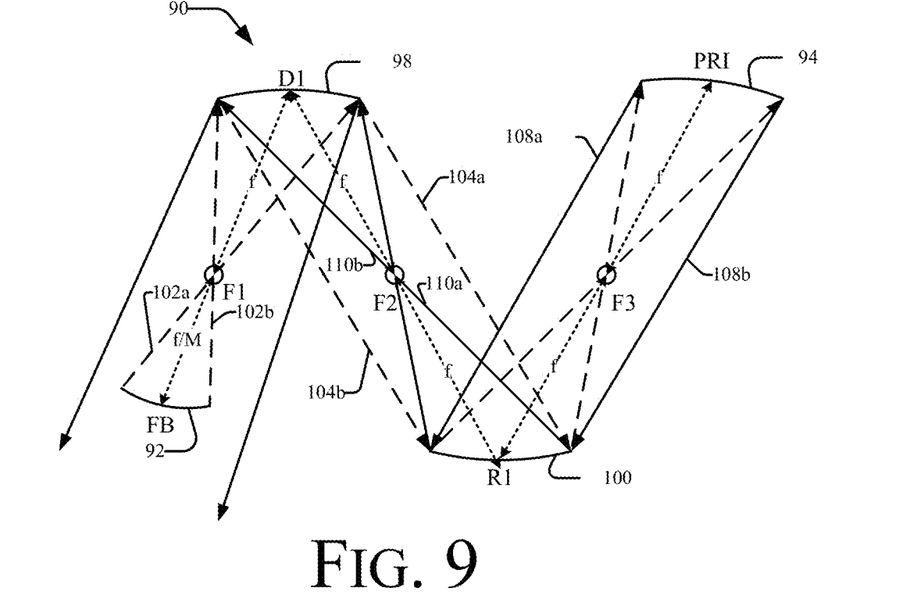
FIGS. 9-11 are schematic illustrations of resonators in accordance with examples.

Referring now to FIG. 9, which illustrates an unstable NBIR 90 having as end mirrors a spherical concave feedback mirror 92 and spherical concave primary mirror 94. The end mirrors are disposed in the resonator cavity, at opposite ends of the resonator optical axis 96. A 1:1 imaging system, consisting of concave mirrors D1 (98) and R1 (100) sequentially arranged along the optical axis, is imbedded between the end mirrors 92, 94. The mirrors D1 and R1 form the 1:1 imaging system and replace the lenses L1 and L2 of the earlier imaging systems described with respect to FIGS. 11 and 12. Both of these mirrors have a focal length f and are separated by a distance 2 f as shown in FIG. 13. In this embodiment the primary mirror 94 also has a focal length f and the feedback mirror 92 has a focal length f/M, where M>1 is the resonator magnification, hence, the unstable imaging resonator is confocal.

In this embodiment the concave mirror D1 (98) is a laser disk and R1 is a relay mirror. Laser disks, such as the Yb:YAG doped thin laser disks available from TRUMPF GMBH & CO., Ditzingen, GERMANY function as spherical concave mirrors having an optical gain, i.e. "active mirrors". These laser disks are typically less than 0.22 mm thick, with a disk diameter that is typically one centimeter. The concave front surface of the disk can possess a typical radius of curvature (ROC) of two meters, and they are pumped from the front by pump light from a diode laser stack that is incident on the disk front surface at an angle of incidence that does not obstruct the main Yb:YAG laser beam. The opposite side, or back surface of the disk is mounted to a heat sink.

The diameters of the reflecting mirror R1 (100) and the disk D1 (98) are greater than 2 Ma, and the two have the same radius of curvature. The pumped diameter on the disk D1 is approximately 2 Ma. If the focal length f=½ ROC, then the separation is ROC and the NBIR 90 is confocal. The R1 mirror and D1 disk are sequentially arranged in an oblique relationship with each other along the optical axis, as are all elements of the NBIR 90. The angle of obliqueness is selected to have a different angle of incidence at the surface of D1 than the laser disk pumping light, and is otherwise as near orthogonal as is permitted by the sequential arrangement of the optical elements so as to minimize laser beam astigmatism and to provide full imaging of the laser light through the 1:1 imaging system.

We again follow the laser beam in a round trip of the NBIR 90, where the return light reflected from the feedback mirror 92 is shown dashed and the forward path light is in solid. The light 102a, 102b reflected from feedback mirror 92 converges to focal point F1 and is diverging when incident on D 1. D1 collimates the beam 104a, 104b as incident at R1, which focuses the beam at F3 where it diverges 106a, 106b as incident at primary mirror 94. The primary mirror collimates the beam 108a, 108b and presents it to R1 which focuses it at focal point F2 and it is divergent 110a, 110b at D1. D1 then collimates the light as output beam 112. The round trip beam is sequentially focused at F1, F3 and F2, and the odd number of intracavity foci characterizes the resonator as a negative branch imaging resonator.

As described above, the 1:1 imaging systems may equally be embedded in PBIR configurations although NBIR configurations provide the added benefit of being less alignment sensitive. Similarly, in the embodiment of FIG. 9 and in each of the embodiments to follow, the positions of the laser disks and reflecting mirrors could be interchanged, and it is also possible to replace the reflecting mirrors themselves with laser disks so that the optical elements of the 1:1 imaging system may both be laser disks.

Figure 10:
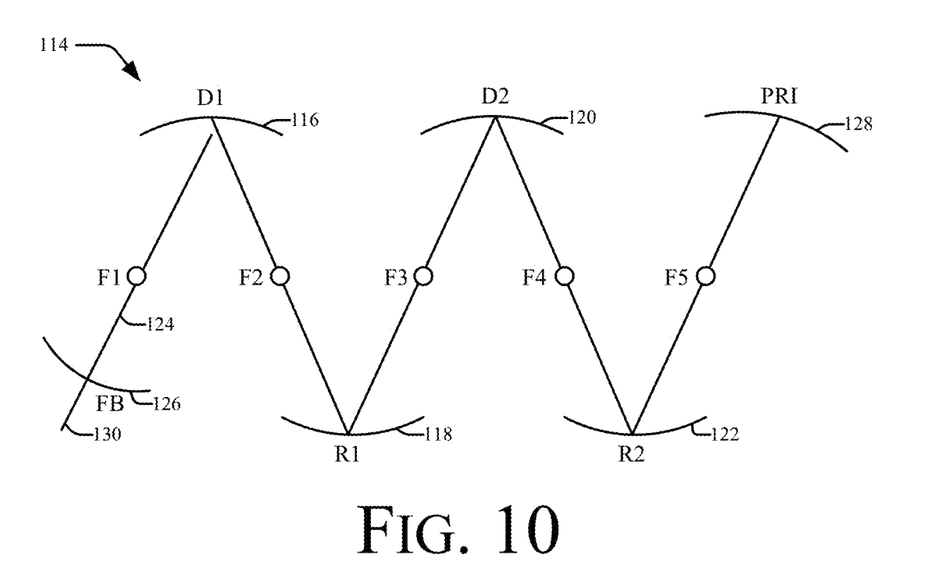

FIG. 10 is an NBIR 114 having two cascaded 1:1 imaging systems imbedded within the resonator. This includes D1 (116) and R1 (118) and D2 (120) and R2 (122), all with focal length f, which are mutually spaced a distance 2 f apart. The imaging systems are sequentially arranged in an oblique manner along the NBIR optical axis 124 between a feedback mirror 126 and a primary mirror 128. The primary mirror 128 has a focal length f and the feedback mirror has a focal length f/M where M>1 is the resonator magnification, and the NBIR 114 is confocal.

To avoid complexity in illustration the beam propagation of this six element NBIR 114 is shown with a single line (the optical axis of the resonator). As understood the NBIR output beam 130 is collimated and the light reflected from the feedback mirror is a converging beam that is focused at F 1. The reflected light is then focused at F3 and F5 in its reverse (feedback) path and at F4 and F2 in its forward (output) path for a total five foci.

As may be seen from the embodiments of FIGS. 9-10 the essential features of the output laser beam are independent of the number of 1:1 imaging systems that are cascaded and imbedded within the resonator. Therefore, the invention allows scaling which permits incorporation of as many laser disks as necessary to satisfy functional requirements, such as output power, subject to physical limitations on size and weight.

In such scaling, all disks are imaged on each other and all relay mirrors are imaged upon each other. The focal lengths f and spacing 2f are chosen to provide an intracavity resonator beam that has the same diameter on all of the laser disks on both the feedback pass and the output pass. This is desirable for efficient power extraction from the laser disks.

U.S. Pat. No. 7,978,746 to Dale A. Holmes and assigned to the Boeing Company of Chicago, Ill., USA, describes an unstable laser resonator structured to provide a 1:1 imaging system between adjacent optical elements in the resonator. The disclosure of U.S. Pat. No. 7,978,746 is incorporated herein by reference in its entirety.

In the example resonators described in U.S. Pat. No. 7,978,746 laser disks are positioned along a central axis in a first plane and reflecting mirrors are positioned in a second plane which is parallel to and opposing the first plane. The resonator structures described herein provide optics comparable to those described in U.S. Pat. No. 7,978,746 but in a more compact structure, which enables greater power magnification given physical constraints on a resonator system dimensions.

Figure 11:
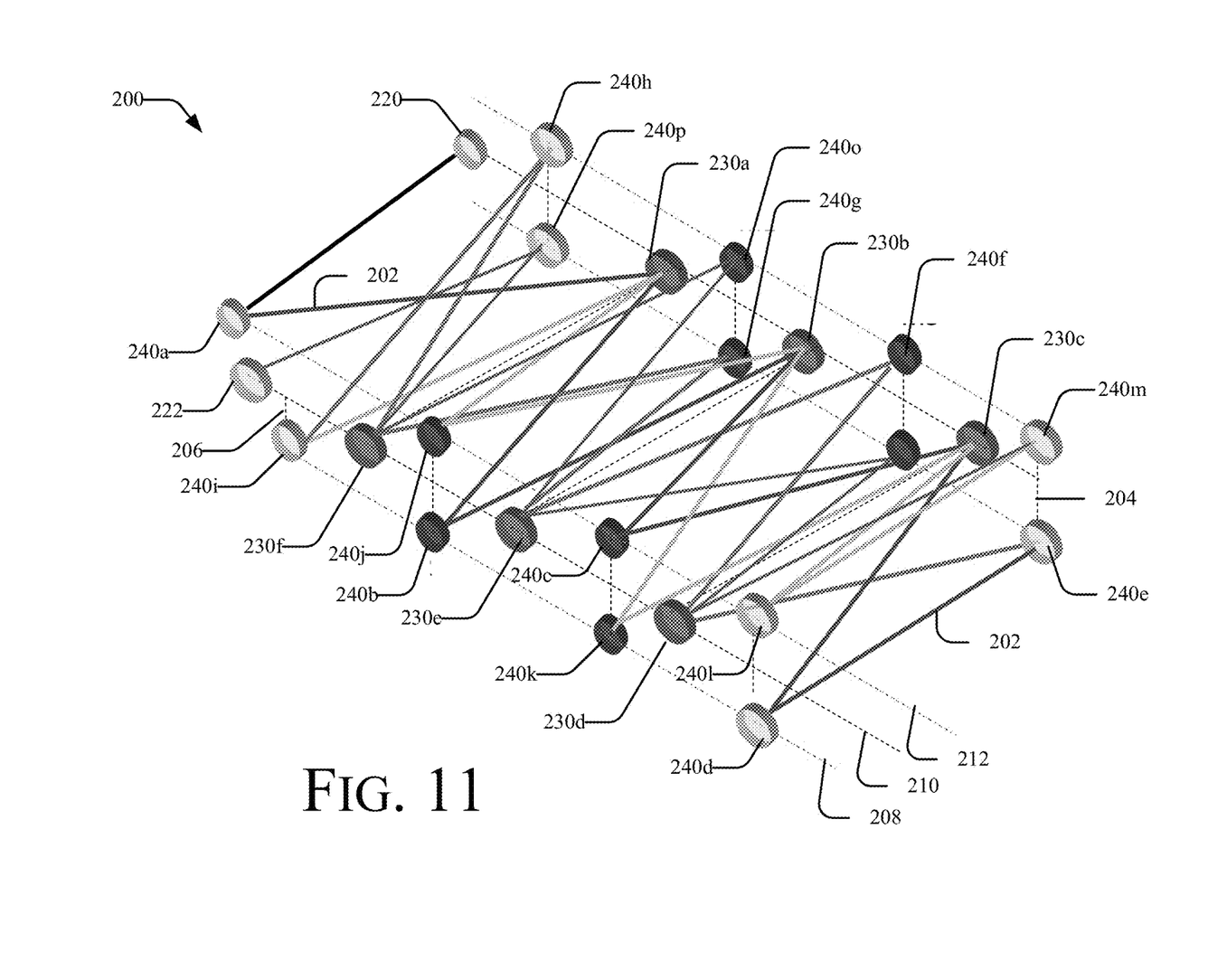

Referring now to the example depicted in FIG. 11, an unstable image resonator 200 comprises optical elements are arranged in two opposing planes, which are depicted as vertical planes in FIG. 11: a first vertical plane 204 and a second vertical plane 206. Further, the optical elements of resonator 200 are disposed in three parallel planes which are depicted as horizontal in FIG. 11: a lower horizontal plane 208, a center horizontal plane 210, and an upper horizontal plane. It will be understood that the terms "horizontal" and "vertical" are used herein only for descriptive clarity and do not connote an orientation with reference to an external orientation system. The particular orientation of the resonator may change the orientation of the horizontal and vertical planes with reference to the external orientation system.

Resonator 200 comprises a feedback mirror 220 and a primary mirror 222 which provide unstable resonator oscillation of a laser signal which propagates along an optical axis 202 between the feedback mirror 210 and the primary mirror 220. The feedback mirror 220 is disposed in the first vertical plane 204. The primary mirror 222 is disposed in the second vertical plane 206. Both the feedback mirror 220 and the primary mirror 222 are disposed in the central horizontal plane 210.

Resonator 200 comprises a plurality of laser disks 230a-230f, which may be referred to collectively herein by reference numeral 230. A first plurality of laser disks 230 are disposed in the first vertical plane 204 and a second plurality of laser disks 230 are disposed in the second vertical plane 206, opposite the first vertical plane 204. Further, the plurality of laser disks 230 are disposed in the center horizontal plane 210. As described above, laser disks 230 may be embodied as thin laser disks available from TRUMPF GMBH & CO., Ditzingen, GERMANY, which function as spherical concave mirrors having an optical gain, i.e. "active mirrors".

A first plurality of reflecting mirrors 240 are disposed in the first vertical plane 204 and a second plurality of reflecting mirrors 240 are disposed in the second vertical plane 206. A first set of reflecting mirrors 240 are disposed in the lower horizontal plane 208 and a second set of reflecting mirrors 240 are disposed in the upper horizontal plane 212.

The respective laser disks 230 and reflecting mirrors 240 adjacent in the optical axis are positioned and dimensioned to provide a 1:1 imaging system therebetween, as described in greater detail below. In the example depicted in FIG. 11 the first vertical plane 204 is disposed in an image plane of the second plurality of laser disks 230 and the second plurality of reflecting mirrors 240 which are disposed in the second vertical plane 206. Similarly, the second vertical plane is disposed in an image plane of the first plurality of laser disks 230 and the first plurality of reflecting mirrors 240 which are disposed in the first vertical plane 204.

Further, the laser disks 230 and reflecting mirrors 240 are formed with the same radius of curvature (ROC) and focal length (f) to ensure that electromagnetic radiation incident on their surfaces is imaged onto an opposing optical element. Thus, the first plurality of laser disks 230a, 230b, 230c disposed in the first vertical plane 204 comprise a concave spherical surface having a first radius of curvature and a first focal length. The second plurality of laser disks 230d, 230e, 230f also comprise a concave spherical surface having a second radius of curvature and a second focal length equal to the first radius of curvature and the first focal length.

The first plurality of reflecting mirrors 240a, 240b, 240c, 240d disposed in the second vertical plane 206 comprise a concave spherical surface having a third radius of curvature and a third focal length equal to the first radius of curvature and the first focal length. The second plurality of reflecting mirrors 240 comprise a concave spherical surface having a fourth radius of curvature and a fourth focal length equal to the first radius of curvature and the first focal length. Adjacent laser disks 230 and reflecting mirrors 240 are separated by a distance along the optical axis 202 that corresponds to the first radius of curvature.

Having described structural elements of the resonator 200, attention will now be turned to operation of the resonator 200. In operation, a radiation beam is input into resonator 200 via the feedback mirror 220, which lies in the central horizontal plane 210. The radiation beam is reflected from feedback mirror 220 to reflecting mirror 240a, which lies in the upper horizontal plane 212. The beam is reflected from reflecting mirror 240a to laser disk 230a, which lies in the central horizontal plane 210. Laser disk 230a amplifies the beam, which is reflected to reflecting mirror 240b, which lies in the lower horizontal plane 208. The beam is reflected from reflecting mirror 240b onto laser disk 230b, where it is amplified and reflected onto reflecting mirror 240c, which lies in the upper horizontal plane 212. The beam is reflected from reflecting mirror 240c onto laser disk 230c, where it is amplified and reflected onto reflecting mirror 240d, which lies in the lower horizontal plane 208.

The beam is reflected from reflecting mirror 240d to another reflecting mirror 240e, which also lies in the lower horizontal plane 208. The reflecting mirror 240e reflects the beam onto laser disk 230d, where it is amplified and reflected onto reflecting mirror 240f, which lies in the upper horizontal plane 212. The beam is reflected from reflecting mirror 240f onto laser disk 230e, where it is amplified and reflected onto reflecting mirror 240g, which lies in the lower horizontal plane 208. The beam is reflected from reflecting mirror 240g onto laser disk 230f, where it is amplified and reflected onto reflecting mirror 240h, which lies in the upper horizontal plane 212.

Reflecting mirror 240h reflects the beam onto reflecting mirror 240i, lies in the lower horizontal plane 208. Reflecting mirror 240h reflects the beam onto laser disk 230a, where it is amplified and reflected onto reflecting mirror 240j, which lies in the upper horizontal plane 212. The beam is reflected from reflecting mirror 240j onto laser disk 230b, where it is amplified and reflected onto reflecting mirror 240k, which lies in the lower horizontal plane 208. Reflecting mirror 240k reflects the beam onto laser disk 230c, where it is amplified and reflected onto reflecting mirror 240l, which lies in the upper horizontal plane 212.

Reflecting mirror 240l reflects the beam onto reflecting mirror 240m, which also lies in the upper horizontal plane 212. Reflecting mirror 240m reflects the beam onto laser disk 230*d*, where it is amplified and reflected onto reflecting mirror 240*n*, which lies in the lower horizontal plane 208. Reflecting mirror 240*n* reflects the beam onto laser disk 230*e*, where it is amplified and reflected onto reflecting mirror 240*o*, which lies in the upper horizontal plane 212. Reflecting mirror 240*o* reflects the beam onto laser disk 230*f*, where it is amplified and reflected onto reflecting mirror 240*p*, which lies in the lower horizontal plane 208.

Reflecting mirror 240*p* reflects the beam onto primary mirror 222, where the beam is reflected back upon itself to follow the reverse path through the resonator 200 to feedback mirror 220, where a portion of the beam may exit the resonator as an output beam.

Thus, a beam input into resonator 200 from feedback mirror 220 follows an optical path which traverses the resonator four times before striking the primary mirror 222, and then follows the reverse optical path, traversing the resonator four times before striking the feedback mirror 220, where a portion of the beam may exit the resonator as an output beam. Thus, a laser signal input into the resonator 200 via the feedback mirror 220 strikes each laser disk 230 twice before a portion of the laser signal exits the resonator via the feedback mirror 240.

In each traversal of the resonator 200, a laser signal reflected from a laser disk 230 are reflected onto reflecting mirrors which alternate between the upper horizontal plane 212 and the lower horizontal plane 208. More particularly, a laser signal reflected onto a laser disk 230 from a reflecting mirror 240 in the upper horizontal plane is reflected by the laser disk 230 to a reflecting mirror in the lower horizontal plane, and a laser signal reflected onto a laser disk 230 from a reflecting mirror 240 in the lower horizontal plane is reflected by the laser disk 230 to a reflecting mirror 240 in the upper horizontal plane 212. Because the laser signal is inverted between adjacent laser disks 230 in the optical axis, following an optical path which alternates between reflecting mirrors on the upper horizontal plane 212 and the lower horizontal plane 208 reduces distortion in the reflections by canceling geometric aberrations (e.g., astigmatism).

In some examples the feedback mirror 220, the primary mirror 222, and respective laser disks 230 and reflecting mirrors 240 are positioned to provide negative branch imaging resonator, while in other examples the feedback mirror 220, the primary mirror 222, and respective laser disks 230 and reflecting mirrors 240 positioned to provide positive branch imaging resonator.

Although the example resonator 200 depicted in FIG. 11 comprises six laser disks 230, it will be recognized that the resonator 200 may include more or fewer laser disks 230. The particular number of laser disks 230 may be determined by factors such as the amount of magnification needed for a given application and/or physical constraints on the size of resonator 200.

Figure 12:
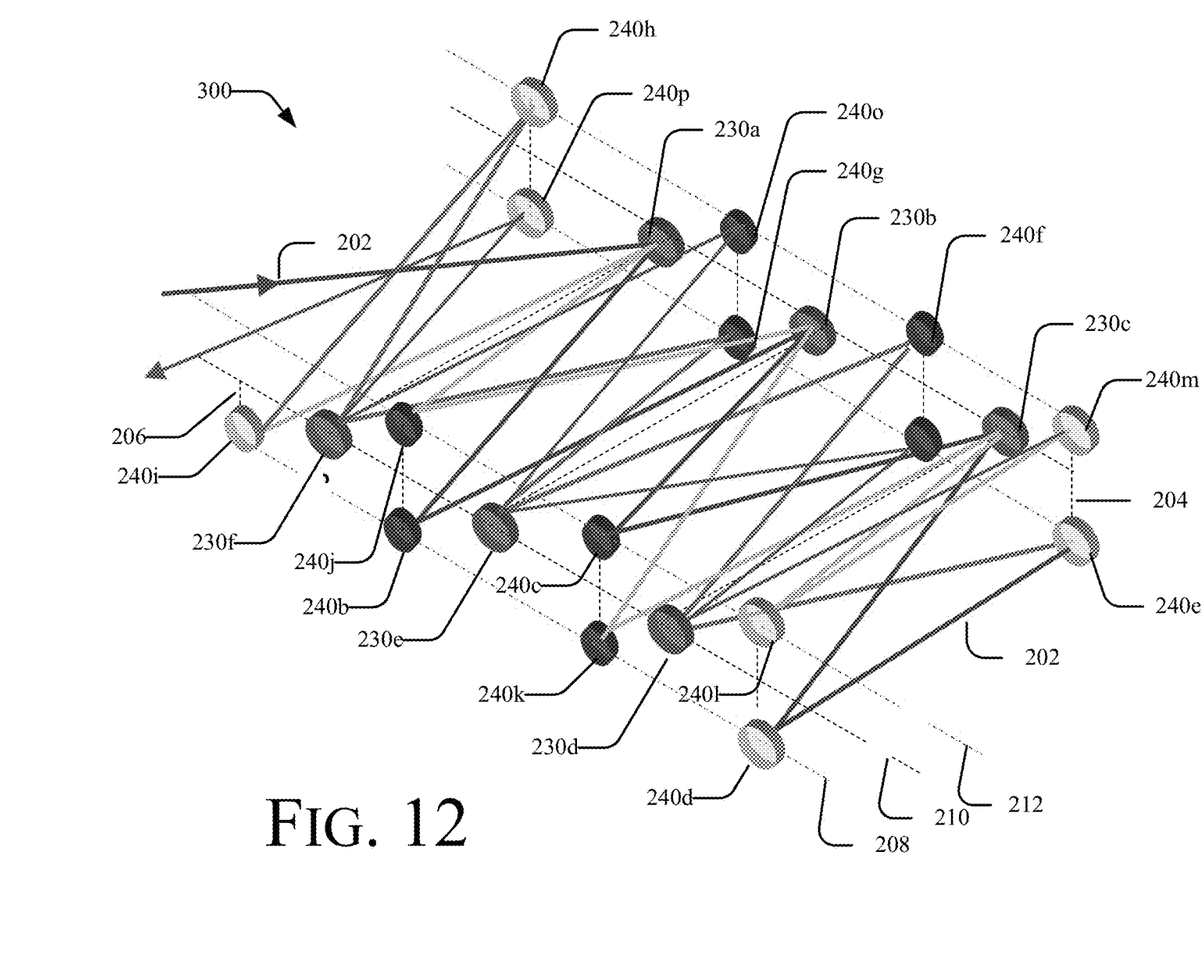
FIG. 12 is a schematic illustration of a power amplifier in accordance with examples.

The resonator 200 may be used as a laser power amplifier by omitting the feedback mirror 220 and the primary mirror 222. FIG. 12 is a schematic illustration of a power amplifier 300 in accordance with examples. Referring to FIG. 11, a laser beam may be input along optical axis 202 and directed onto laser disk 230*a*. The laser beam traverses the optical path through the power amplifier in the same manner it traversed the resonator 200 as described with reference to FIG. 11. However, because the primary mirror is removed the beam is output from the power amplifier 300 rather than being reflected from the primary mirror.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
an unstable imaging resonator having a length along a first axis and a width along a second axis perpendicular to the first axis, the unstable imaging resonator comprising:
a feedback mirror and a primary mirror which provide unstable resonator oscillation of a laser signal which propagates between the feedback mirror and the primary mirror;
a first plurality of laser disks disposed in a first plane and a second plurality of laser disks disposed in a second plane opposite the first plane, wherein the first plurality of laser disks and second plurality of laser disks are disposed in a central plane, wherein the first plane is perpendicular to the central plane, and wherein the first plane and second plane are displaced from each other along the second axis; and
a first plurality of reflecting mirrors disposed in the first plane and a second plurality of reflecting mirrors disposed in the second plane, wherein a first set of reflecting mirrors of the first plurality of reflecting mirrors and the second plurality of reflecting mirrors are disposed in a lower plane and a second set of reflecting mirrors of the first plurality of reflecting mirrors and the second plurality of reflecting mirrors are disposed in an upper plane, wherein the lower plane is parallel with the central plane, wherein the upper plane is parallel with the central plane;
wherein the first plurality of laser disks, the second plurality of laser disks, the first plurality of reflecting mirrors, and the second plurality of reflecting mirrors are arranged such that the laser signal propagates across the length at least four times when propagating between the primary mirror and the feedback mirror.

2. The apparatus of claim 1, wherein:
the first plane is disposed in a first image plane of the second plurality of laser disks and the second plurality of reflecting mirrors; and
the second plane is disposed in a second image plane of the first plurality of laser disks and the first plurality of reflecting mirrors.

3. The apparatus of claim 1, wherein:
the feedback mirror is disposed in the first plane;
the primary mirror is disposed in the second plane; and
the feedback mirror and the primary mirror are disposed in the central plane.

4. The apparatus of claim 1, wherein:
the first plurality of laser disks each comprise a first concave spherical surface having a first radius of curvature and a first focal length;
the second plurality of laser disks each comprise a second concave spherical surface, the second concave spherical surface having a second radius of curvature equal to the first radius of curvature and having a second focal length equal to the first focal length;
the first plurality of reflecting mirrors each comprise a third concave spherical surface, the third concave spherical surface having a third radius of curvature equal to the first radius of curvature and having a third focal length equal to the first focal length; and the second plurality of reflecting mirrors each comprise a fourth concave spherical surface, the fourth concave spherical surface having a fourth radius of curvature equal to the first radius of curvature and having a fourth focal length equal to the first focal length.

5. The apparatus of claim 4, wherein subsequent laser disks and reflecting mirrors along a path of the laser signal are separated by a distance along the path of the laser signal that corresponds to the first radius of curvature.

6. The apparatus of claim 1, wherein:
when the laser signal is reflected onto a particular laser disk from a first particular reflecting mirror in the upper plane, the laser signal is reflected by the particular laser disk to a second particular reflecting mirror in the lower plane; and
when the laser signal is reflected onto the particular laser disk from a third particular reflecting mirror in the lower plane, the laser signal is reflected by the particular laser disk to a fourth particular reflecting mirror in the upper plane.

7. The apparatus of claim 1, wherein the laser signal is input into the unstable imaging resonator via the feedback mirror, and wherein the laser signal strikes each laser disk four times before a portion of the laser signal exits the unstable imaging resonator via the feedback mirror.

8. The apparatus of claim 1, wherein the laser signal is inverted between subsequent laser disks along a path of the laser signal.

9. The apparatus of claim 1, wherein the unstable imaging resonator is a negative branch imaging resonator.

10. The apparatus of claim 1, wherein the unstable imaging resonator is a positive branch imaging resonator.

11. An apparatus, comprising:
a power amplifier having a length along a first axis and a width along a second axis perpendicular to the first axis, the power amplifier comprising:
a first plurality of laser disks disposed in a first plane and a second plurality of laser disks disposed in a second plane opposite the first plane, wherein the first plurality of laser disks and second plurality of laser disks are disposed in a central plane, wherein the first plane is perpendicular to the central plane, and wherein the first plane and second plane are displaced from each other along the second axis; and
a first plurality of reflecting mirrors disposed in the first plane and a second plurality of reflecting mirrors disposed in the second plane, wherein a first set of reflecting mirrors of the first plurality of reflecting mirrors and the second plurality of reflecting mirrors are disposed in a lower plane and a second set of reflecting mirrors of the first plurality of reflecting mirrors and the second plurality of reflecting mirrors are disposed in an upper plane, wherein the lower plane is parallel with the central plane, wherein the upper plane is parallel with the central plane;
wherein the first plurality of laser disks, the second plurality of laser disks, the first plurality of reflecting mirrors, and the second plurality of reflecting mirrors are arranged such that the laser signal propagates across the length at least four times when propagating through the power amplifier.

12. The apparatus of claim 11, wherein:
the first plane is disposed in a first image plane of the second plurality of laser disks and the second plurality of reflecting mirrors; and
the second plane is disposed in a second image plane of the first plurality of laser disks and the first plurality of reflecting mirrors.

13. The apparatus of claim 11, wherein:
the first plurality of laser disks each comprise a first concave spherical surface having a first radius of curvature and a first focal length;
the second plurality of laser disks each comprise a second concave spherical surface, the second concave spherical surface having a second radius of curvature equal to the first radius of curvature and having a second focal length equal to the first focal length;
the first plurality of reflecting mirrors each comprise a third concave spherical surface, the third concave spherical surface having a third radius of curvature equal to the first radius of curvature and having a third focal length equal to the first focal length; and
the second plurality of reflecting mirrors each comprise a fourth concave spherical surface, the fourth concave spherical surface having a fourth radius of curvature equal to the first radius of curvature and having a fourth focal length equal to the first focal length.

14. The apparatus of claim 13, wherein subsequent laser disks and reflecting mirrors along a path of the laser signal are separated by a distance along the path of the laser signal that corresponds to the first radius of curvature.

15. The apparatus of claim 11, wherein:
when the laser signal is reflected onto a particular laser disk from a first particular reflecting mirror in the upper plane, the laser signal is reflected by the particular laser disk to a second particular reflecting mirror in the lower plane; and
when the laser signal is reflected onto the particular laser disk from a third particular reflecting mirror in the lower plane, the laser signal is reflected by the particular laser disk to a fourth particular reflecting mirror in the upper plane.

16. The apparatus of claim 11, wherein the laser signal is inverted between subsequent laser disks along a path of the laser signal.

17. The apparatus of claim 11, wherein the first plurality of laser disks, the second plurality of laser disks, the first plurality of reflecting mirrors, and the second plurality of reflecting mirrors are arranged such that the laser signal propagates only once between a first particular laser disk to a subsequent reflecting mirror along a path of the laser signal while the laser signal propagates through the power amplifier.

18. The apparatus of claim 11, wherein the laser signal propagates across the width at least sixteen times when propagating through the power amplifier.

19. The apparatus of claim 1, wherein the first plurality of laser disks, the second plurality of laser disks, the first plurality of reflecting mirrors, and the second plurality of reflecting mirrors are arranged such that the laser signal propagates only once between a first particular laser disk to a subsequent reflecting mirror along a path of the laser signal while the laser signal propagates between the primary mirror and the feedback mirror.

20. The apparatus of claim 1, wherein the laser signal propagates across the width at least sixteen times when propagating between the primary mirror and the feedback mirror.

* * * * *